(12) United States Patent
Ge et al.

(10) Patent No.: US 11,461,922 B2
(45) Date of Patent: Oct. 4, 2022

(54) DEPTH ESTIMATION IN IMAGES OBTAINED FROM AN AUTONOMOUS VEHICLE CAMERA

(71) Applicant: TUSIMPLE, INC., San Diego, CA (US)

(72) Inventors: Lingting Ge, San Diego, CA (US); Siyuan Liu, San Diego, CA (US); Zehua Huang, San Diego, CA (US); Yijie Wang, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 24 days.

(21) Appl. No.: 16/909,987

(22) Filed: Jun. 23, 2020

(65) Prior Publication Data

US 2021/0398310 A1   Dec. 23, 2021

(51) Int. Cl.
*G06T 7/70* (2017.01)
*G06T 7/11* (2017.01)
*B60W 60/00* (2020.01)
*G01C 21/30* (2006.01)
*G06V 20/58* (2022.01)

(52) U.S. Cl.
CPC ........... *G06T 7/70* (2017.01); *B60W 60/0025* (2020.02); *G01C 21/30* (2013.01); *G06T 7/11* (2017.01); *G06V 20/58* (2022.01); *G06V 20/584* (2022.01); *B60W 2300/12* (2013.01); *B60W 2420/42* (2013.01); *B60W 2552/00* (2020.02); *B60W 2554/402* (2020.02); *G06T 2207/20132* (2013.01); *G06T 2207/30196* (2013.01); *G06T 2207/30261* (2013.01)

(58) Field of Classification Search
None
See application file for complete search history.

(56) References Cited

U.S. PATENT DOCUMENTS

| | | | | |
|---|---|---|---|---|
| 8,253,797 | B1 * | 8/2012 | Maali | G06T 7/73 348/143 |
| 8,897,541 | B2 * | 11/2014 | Weisenburger | G01C 11/00 382/154 |
| 8,942,483 | B2 * | 1/2015 | Janky | G06K 9/00 382/195 |

(Continued)

FOREIGN PATENT DOCUMENTS

WO   WO2019093532 A1 * 5/2019
WO   WO2021138618 A1 * 7/2021

OTHER PUBLICATIONS

Exploiting Sparse Semantic HD Maps for Self-Driving Vehicle Localization. Ma et al. (Year: 2019).*

(Continued)

*Primary Examiner* — Delomia L Gilliard
(74) *Attorney, Agent, or Firm* — Paul Liu; Glenn Theodore Matthews; Perkins Coie, LLP

(57) ABSTRACT

Image processing techniques are described to receive bounding box information that describes a bounding box located around a detected object in an image, determine one or more positions of one or more reference points on the bounding box, determine, for each reference point, 3D world coordinates of a point of intersection of the reference point and the road surface, and assign the 3D world coordinates of the one or more reference points to a location of the detected object.

20 Claims, 15 Drawing Sheets

(56) References Cited

U.S. PATENT DOCUMENTS

| | | | |
|---|---|---|---|
| 10,395,117 B1* | 8/2019 | Zhang | G01C 21/206 |
| 2011/0282578 A1* | 11/2011 | Miksa | G06F 16/29 |
| | | | 701/532 |
| 2017/0185823 A1* | 6/2017 | Gold | G06T 19/006 |
| 2018/0262789 A1* | 9/2018 | Foulzitzis | H04N 21/42202 |
| 2018/0293445 A1* | 10/2018 | Gao | B60W 10/10 |
| 2018/0336421 A1* | 11/2018 | Huang | G06V 20/56 |
| 2018/0365835 A1 | 12/2018 | Yan et al. | |
| 2019/0138822 A1* | 5/2019 | Yao | G01S 17/42 |
| 2019/0392268 A1 | 12/2019 | Tariq | |
| 2020/0082180 A1* | 3/2020 | Wang | G06T 7/80 |
| 2020/0082561 A1* | 3/2020 | Karonchyk | G06F 16/51 |
| 2020/0311979 A1* | 10/2020 | Chang | G06T 7/80 |
| 2021/0271906 A1 | 9/2021 | Creusot | |

OTHER PUBLICATIONS

U.S. Appl. No. 16/909,962 Non-Final Office Action dated Nov. 1, 2021, pp. 1-15.
U.S. Appl. No. 16/909,962 Notice of Allowance dated Mar. 3, 2022, pp. 1-7.

\* cited by examiner

DEPTH ESTIMATION IN IMAGES OBTAINED FROM AN AUTONOMOUS VEHICLE CAMERA

TECHNICAL FIELD

This document relates to techniques to determining location of an object in an image obtained from a camera associated with an autonomous vehicle.

BACKGROUND

A vehicle may include cameras attached to the vehicle for several purposes. For example, cameras may be attached to a roof of the vehicle for security purposes, for driving aid, or for facilitating autonomous driving. Cameras mounted on a vehicle can obtain images of one or more areas surrounding the vehicle. These images can be processed to obtain information about the road or about the objects surrounding the autonomous vehicle. Thus, the images obtained from the cameras on an autonomous vehicle can be used to safely maneuver the autonomous vehicle through traffic or on a highway.

SUMMARY

Techniques are disclosed for performing image processing on images obtained from one or more cameras on an autonomous vehicle, such as an autonomous semi-trailer truck.

In an exemplary embodiment, an image processing method comprises receiving bounding box information that describes a bounding box located around a detected object in an image, where the bounding box information is received while a vehicle is being driven, determining, from the bounding box information and in the image, one or more positions of one or more reference points on the bounding box, for each determined position of each reference point: determining camera coordinates of a camera center point located on a ray that passes through a position of a reference point, where the camera center point is located on a camera coordinate plane located at a focal length distance away from an image plane where the image is received, determining, based at least on the camera coordinates, first world coordinates of the position of the reference point, and determining, based on a terrain map, second world coordinates of a point of intersection of the reference point and a road surface, where the terrain map provides coordinates of points in a spatial region where the vehicle is being driven, and assigning the second world coordinates for the one or more reference points to a location of the detected object in the spatial region.

In some embodiments, the second world coordinates of the point of intersection is determined by: obtaining a first set of points along the ray, where the reference point belongs to the first set of points, determining a first set of world coordinates corresponding to the first set of points, where the first world coordinates belongs to the first set of world coordinates, determining, based on the terrain map and corresponding to the first set of points, a second set of points on the road surface, determining a second set of world coordinates corresponding to the second set of points, determining plurality of heights between each point associated with the first set of world coordinates and a corresponding point associated with the second set of world coordinates, determining a minimum height from the plurality of heights, identifying a point from the second set of points associated with the minimum heights, and obtaining world coordinates of the point, where the second world coordinates are determined to be same as the world coordinates of the point.

In some other embodiments, the second world coordinates of the point of intersection is determined by: determining a first mathematical function that describes the ray, determining, based on the terrain map, world coordinates of two or more points on the bounding box, determining a second mathematical function that describes a plane that includes the two or more points, determining an intersection of the first mathematical function and the second mathematical function, and obtaining world coordinates of the intersection, where the second world coordinates are determined to be same as the world coordinates of the intersection. In some embodiments, the second world coordinates of the point of intersection is determined by determining an intersection of the ray and two or more points on the bounding box, and obtaining world coordinates of the intersection, wherein the second world coordinates are determined to be same as the world coordinates of the intersection.

In some embodiments, the bounding box includes a plurality of vertices located at a plurality of corners of the bounding box, the one or more reference points includes a reference point located midpoint in between two vertices of the bounding box, and the two vertices are closest to a surface of a road compared to other vertices of the bounding box. In some embodiments, a camera intrinsic matrix is used to determine the camera coordinates of the camera center point in the camera coordinate plane, and a camera extrinsic matrix is used with the camera coordinates to determine the first world coordinates of the reference point.

In some embodiments, the detected object includes a car, a truck, a truck-trailer, a semi-truck, an emergency vehicle, a pedestrian, a motorcycle, or an obstacle on a road. In some embodiments, the detected object includes another vehicle. In some embodiments, the image is cropped from a second image received from a camera located on the vehicle, where the image is cropped while the vehicle is being driven. In some embodiments, the vehicle is an autonomous semi-trailer truck. In some embodiments, the image is from a first region towards which the vehicle is being driven, or the image is from a second region to a side of the vehicle, or the image is from a third region away from which the vehicle is being driven. In some embodiments, operations associated the receiving the bounding box information, the determining the one or more positions, the determining the camera coordinates, the determining the second world coordinates, and the assigning the second world coordinates are performed in real-time while the vehicle is being driven. In some embodiments, the detected object in the image is located at a distance between 500 meters and 1000 meters In yet another exemplary aspect, the above-described method is embodied in the form of processor-executable code and stored in a computer-readable program medium or a computer readable storage medium. Thus, a non-transitory computer readable storage medium can have code stored thereon, where the code, when executed by a processor, causes the processor to implement the methods described in some embodiments.

In yet another exemplary embodiment, an image processing apparatus or device that includes a processor that is configured or operable to perform the above-described methods is disclosed.

The above and other aspects and their implementations are described in greater detail in the drawings, the descriptions, and the claims.

DETAILED DESCRIPTION

Autonomous vehicles may use sensors or cameras that provides data or images of one or more areas surrounding the autonomous vehicle. A computer located in the autonomous vehicle may perform image processing to determine the presence or absence of objects (e.g., vehicles or pedestrians) within a limited range from the location of the autonomous vehicle. For example, a computer in an autonomous vehicle can perceive objects within a 300-meter distance from the location of the autonomous vehicle. However, a limited range of perception may not be sufficient if the autonomous vehicle is a semi-trailer truck. An autonomous semi-trailer truck is designed to drive safely on the road. However, in some cases, a limited range of perception (e.g., up to 300 meters) may not be sufficient to proactively detect an object on the road so that the autonomous semi-trailer truck may safely stop prior to colliding with that object or to safely maneuver around that object.

The example headings for the various sections below are used to facilitate the understanding of the disclosed subject matter and do not limit the scope of the claimed subject matter in any way. Accordingly, one or more features of one example section can be combined with one or more features of another example section.

I. Long-Distance Perception System

Figure 1:
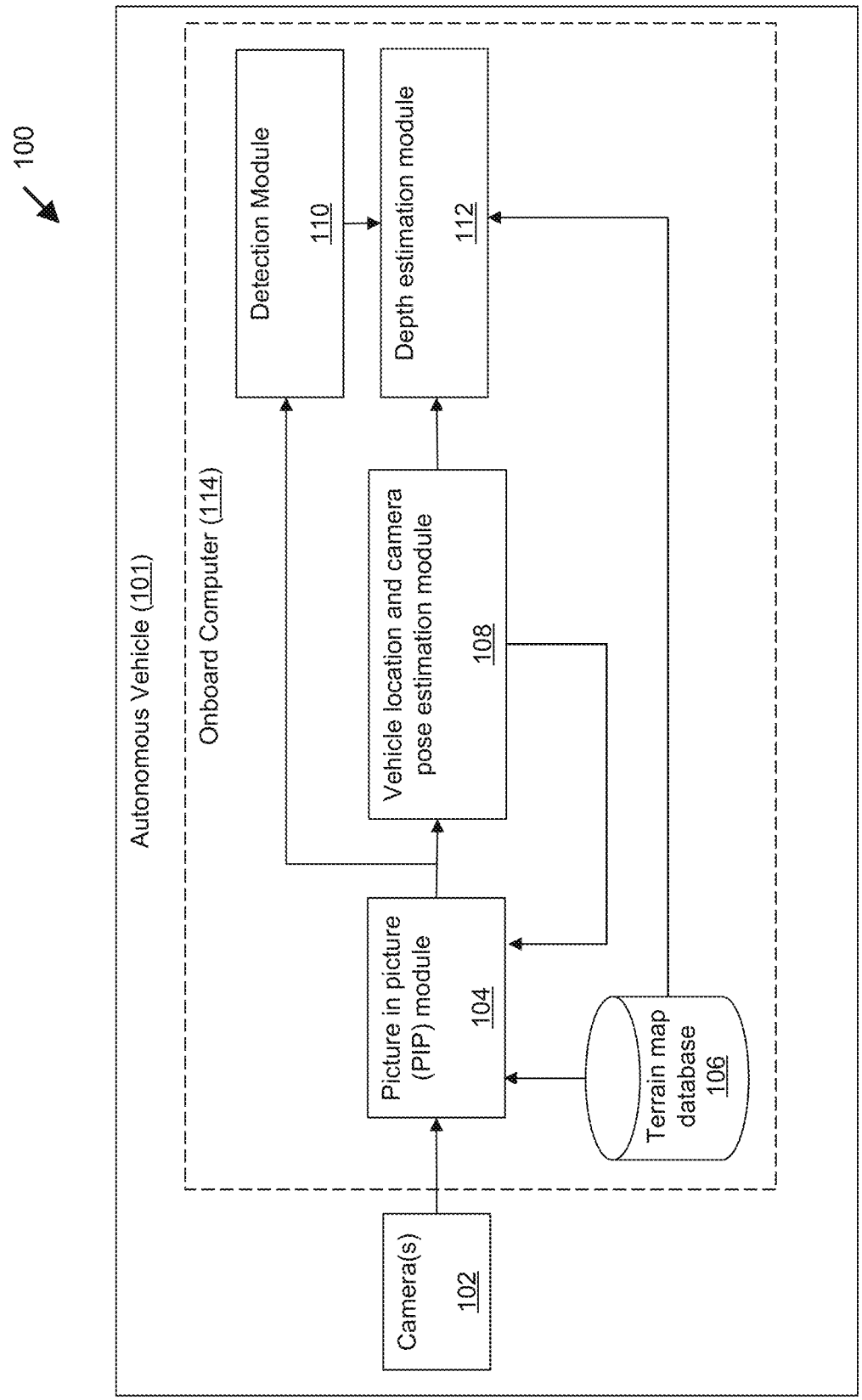
FIG. 1 shows a block diagram of an exemplary long-distance perception system to perform image processing on images obtained from one or more cameras in or on an autonomous vehicle.

FIG. 1 shows a block diagram of an exemplary long-distance perception system 100 to perform image processing on images obtained from one or more cameras 102 in or on an autonomous vehicle 101, such as an autonomous semi-trailer truck. The exemplary image processing techniques described in some embodiments can be used to get an accurate three-dimension (3D) position of objects located at long distances, such as approximately 1000 meters from the location of the autonomous vehicle 101. The exemplary image processing techniques can also be used to track and build motion models for each object perceived. Thus, the exemplary long-distance perception system 100 can be used to enhance safety of an autonomous vehicle 101 driven on the road.

a. Cameras, Onboard Computers, and Database

The long-distance perception system 100 includes one or more cameras 102 installed on or in an autonomous vehicle 101. Each camera 102 can generate high-resolution images in real-time while the autonomous vehicle 101 is in operation, such as driving on the road or stopping at a stop sign. In some embodiments, the term image can include an image frame from a video feed of a camera 102. The resolution of an image frame from the one or more cameras 102 can be, for example, 1024×576 pixels. The one or more cameras 102 can obtain images at a speed or frequency of, for example, 20 frames per second (FPS).

FIG. 1 shows several modules and a database that can perform image processing based on the images received from the one or more cameras 102. The features or operations of the modules 104, 108, 110, 112 and terrain map database 106 are performed by an onboard computer 114 located in an autonomous vehicle 101. The features or operations of the modules 104, 108, 110, 112 and terrain map database 106 are performed in real-time while the autonomous vehicle 101 is being driven. The onboard computer 114 located in the autonomous vehicle 101 includes at least one processor and a memory having instructions stored thereupon. The instructions upon execution by the processor configure the onboard computer 114 to perform the operations associated with the modules and/or database as described in this patent document.

The terrain map database 106 may be stored in the onboard computer 114 and provides coordinates of various points in the spatial region (e.g., road surface or mountain elevation) where or around which the autonomous vehicle 101 is being driven or is located. The terrain map database 106 stores the terrain information that can be represented in 3D space or 3D world coordinates, where the coordinate information characterizes various points in the spatial region that surrounds the autonomous vehicle 101. For example, a terrain map database 106 can include 3D world coordinates for one or more points of a road surface on which the autonomous vehicle 101 is being driven. In another example, a terrain map database 106 can include 3D world coordinates for one or more points in a spatial region towards which or within which the autonomous vehicle 101 is being driven.

The image processing techniques performed by the various modules shown in FIG. 1 is described in the various sections below. For ease of explanation, the image processing techniques is described for a single frame obtained from a single camera. However, the image processing techniques described in some embodiments can be performed on each frame or on a subset of frames in a time period obtained from each of the one or more cameras 102.

b. First Example Image Processing Technique by Picture-in-Picture Module

In FIG. 1, the onboard computer 114 on an autonomous vehicle can perform image processing to perceive objects (e.g., vehicles, pedestrians, obstacles) from information provided by sensors such as cameras. The picture-in-picture (PIP) module 104 can process the images obtained from the camera(s) 102 to improve perception of objects that can be located far from the location of the autonomous vehicle 101.

As shown in FIG. 1, the images obtained from each camera 102 is sent to a PIP module 104. As explained in this section, the PIP module 104 obtains an original image from a camera to select and crop one or more regions of interest in the image. Next, the PIP module 104 sends the cropped region(s) of interest in the image to one or more downstream modules as shown in FIG. 1, such as the detection module 110.

The PIP module 104 can select and crop one or more regions of interest in an image obtained from a camera 102. The region(s) selected by the PIP module 104 may include area(s) located in front of the autonomous vehicle (e.g., road, highway ramp, or intersection). The selected area(s) are either past a pre-determined distance in front of the location of the autonomous vehicle (e.g., past a distance of approximately 500 meters in front of the location of the autonomous vehicle) or are within a range of pre-determined distances in front of the location of the autonomous vehicle (e.g., between 500 meters to 1000 meters in front of the location of the autonomous vehicle).

Figure 2:
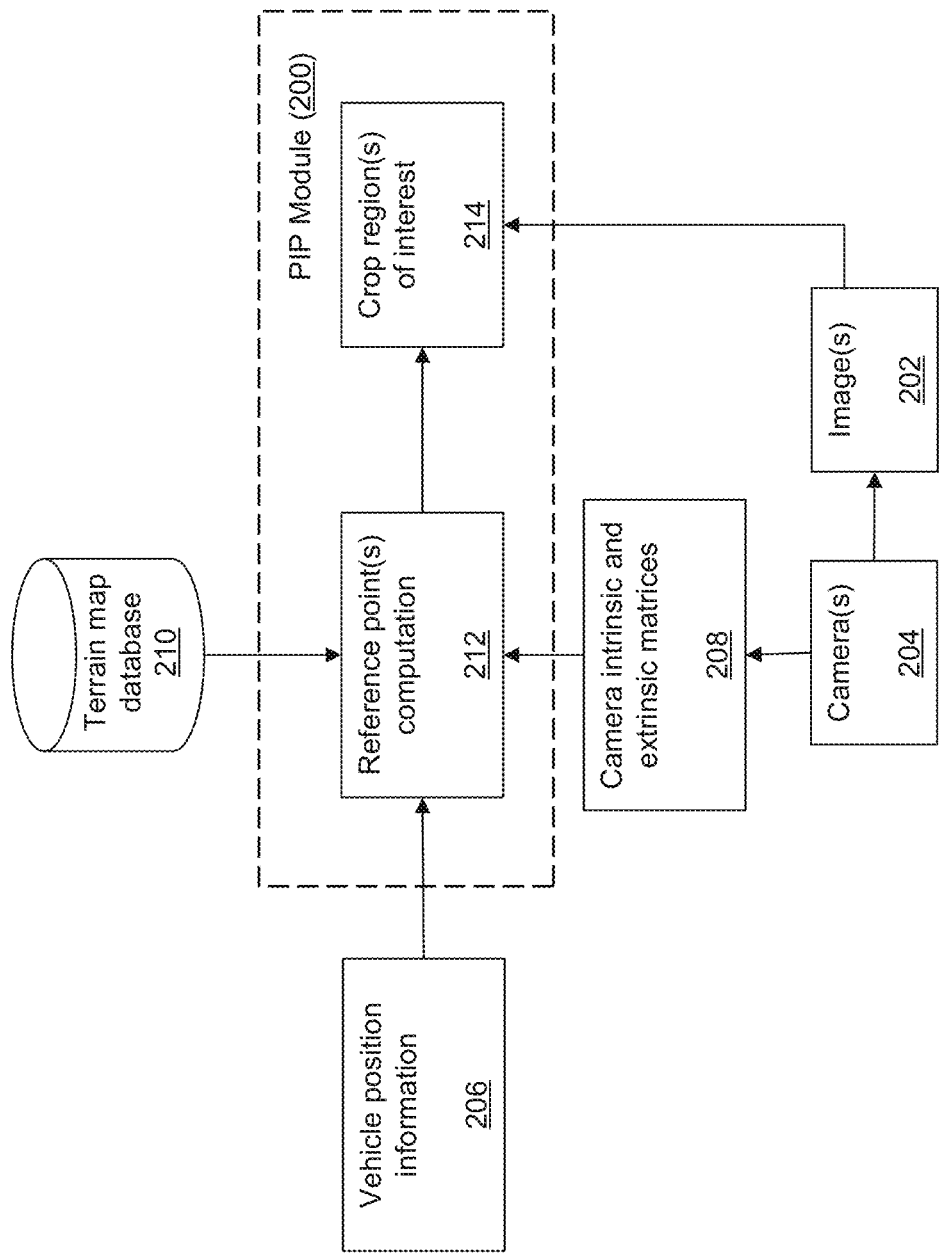
FIG. 2 further shows the operations performed by a picture-in-picture (PIP) module of the long-distance perception system.
Figure 3A:
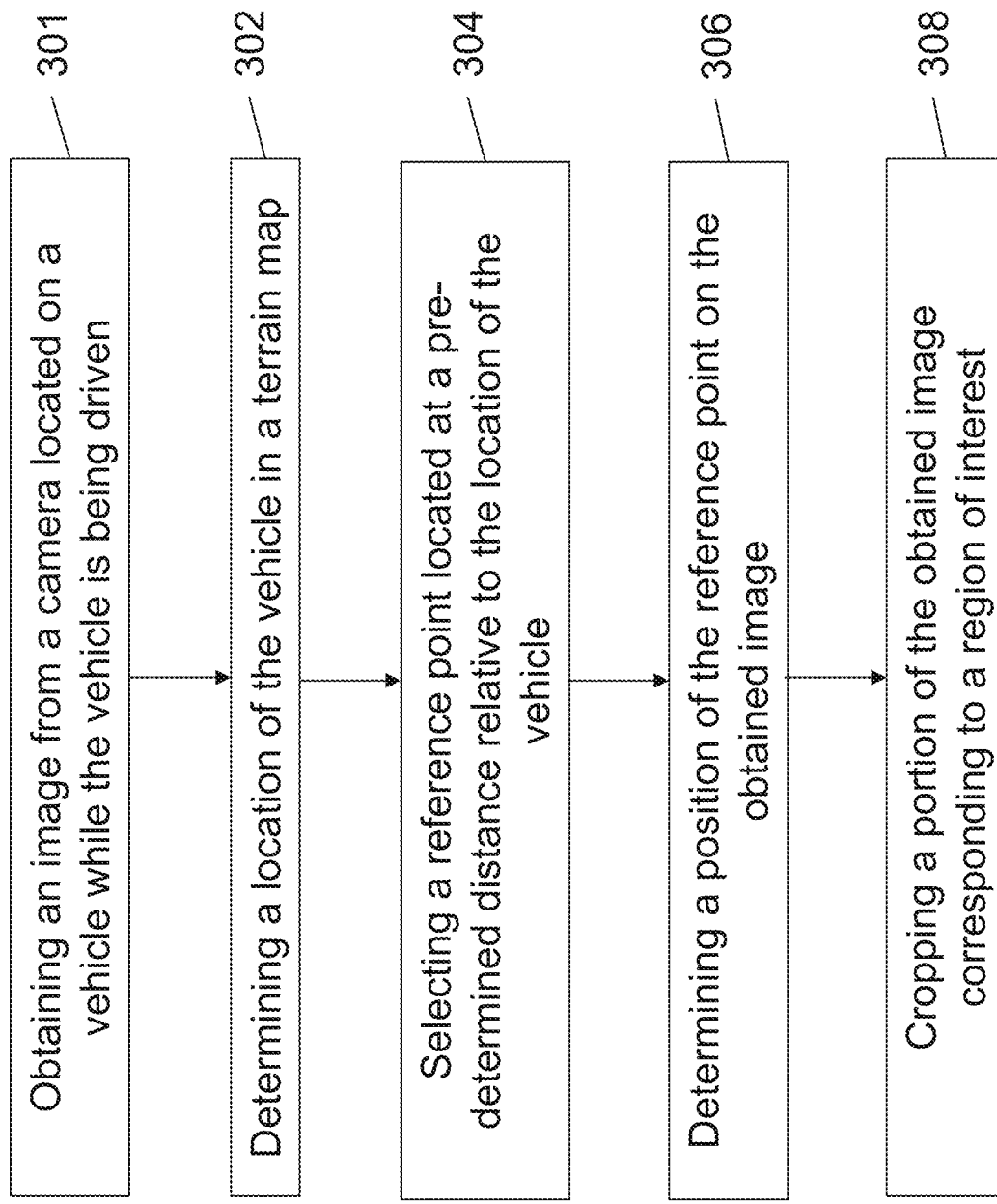
FIG. 3A shows a flowchart of a first exemplary technique to select a region of interest to crop from an image by using a single reference point.
Figure 3B:
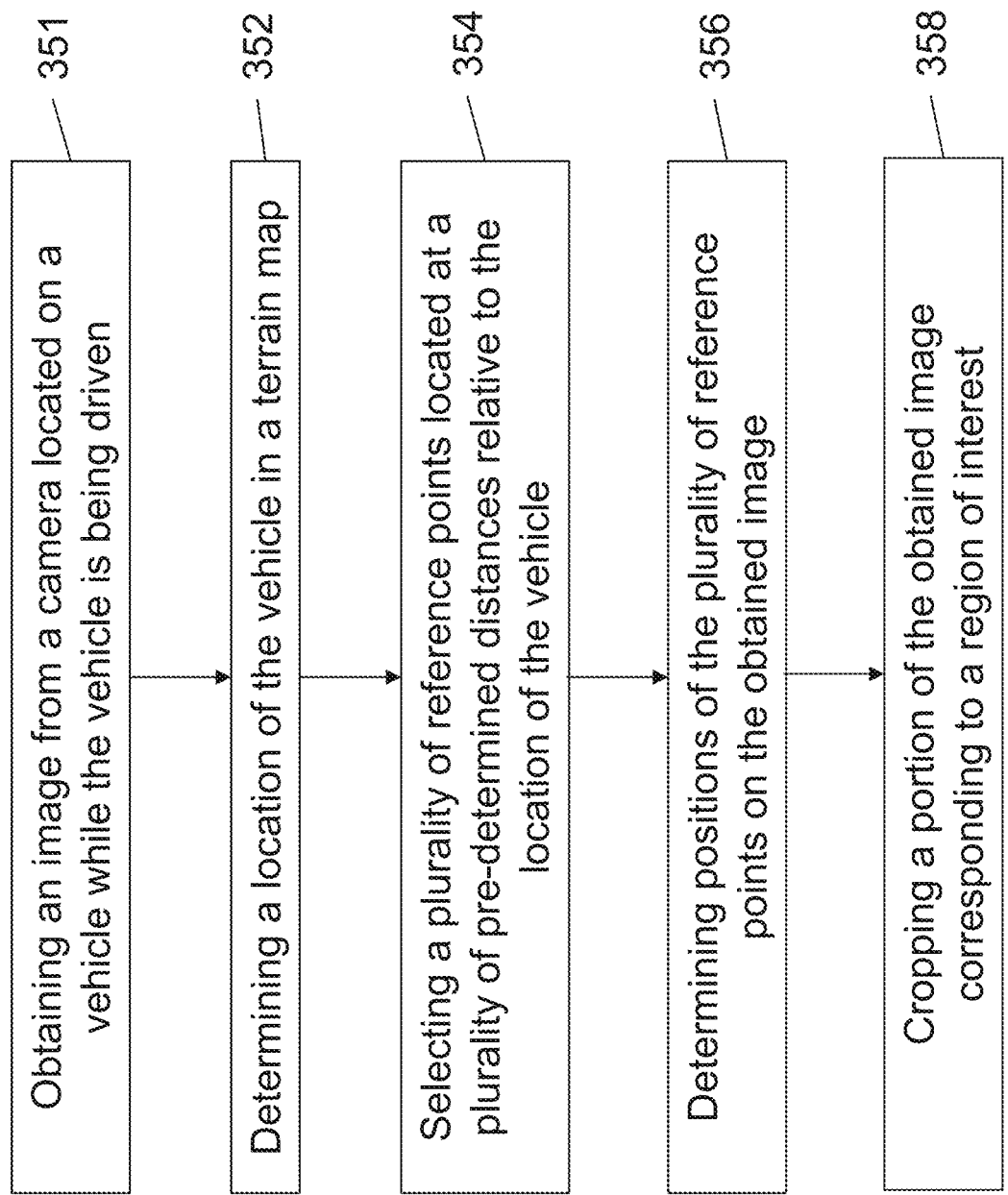
FIG. 3B shows a flowchart of a second exemplary technique to select a region of interest to crop from an image by using at least two reference points.

The PIP module 104 may select and crop region(s) of interest in one of several ways as further described in FIGS. 3A and 3B. Generally, the PIP module 104 can obtain information about a road in front of the autonomous vehicle to select its region(s) of interest. For example, if the PIP module 104 determines that the road is straight (e.g., by identifying the curvature or shape of the lane markers), then the PIP module 104 can select and crop a center region of the original image that includes a region of the road or highway ramp or intersection, where the center region has a pre-determined pixel resolution. In another example, the PIP module 104 can obtain coordinate information of points on the road from a terrain map database 106 so that whether the road is curved or straight the PIP module 104 can select and crop one or more regions of interest that include region(s) of the road or highway ramp or intersection. In both these examples, the selected and cropped region(s) are located in front of and either past a pre-determined distance in front of the location of the autonomous vehicle or within a range of pre-determined distances in front of the location of the autonomous vehicle. The features of the PIP module 104 are further described in FIGS. 2 to 3B.

FIG. 2 further describes the operations performed by the PIP module 200. There are four inputs that can be provided to the PIP module 200. First, an image 202 from a camera 204 is provided as a source image to the PIP module 200. Second, the PIP module 200 receives a real-time position 206 of the autonomous vehicle as another input provided from a Global Positioning System (GPS) device, where the position is used by the PIP module 200 to identify a location of the autonomous vehicle on a terrain map. Third, the PIP module 200 receives from the vehicle location and camera pose estimation module (108 in FIG. 1) the intrinsic camera matrix and extrinsic camera matrix 208 to compute one or more reference points used to obtain region(s) of interest. Fourth, the PIP module 200 receives coordinate information of a terrain map from a terrain map database 210. As further explained in FIGS. 3A and 3B, the PIP module 200 performs reference point(s) computation 212 to compute the position(s) of the reference point(s) on the image 202. The position(s) of the reference point(s) are used to crop region(s) of interest 214. Thus, the output of the PIP module 200 is one or more cropped regions of interest from the original input images.

The PIP module may use pre-defined region(s) of interest to compute one or more reference points. The pre-defined region(s) of interest may include an area in front of the autonomous vehicle (e.g., past 500 meters or between 500 meters and 1000 meters in front of the autonomous vehicle). Once the PIP module determines the region(s) of interest of an image, the PIP module computes a corresponding reference points of each region. The PIP module may use pre-defined region(s) of interest to select region(s) of interest by performing two exemplary techniques described in FIGS. 3A and 3B.

FIG. 3A shows a flowchart of a first exemplary technique to select a region of interest to crop from an image by using a single reference point. In the exemplary technique of FIG. 3A, the PIP module can select a reference point that can be a center point of a pre-defined region of interest. At the obtaining operation 301, the PIP module obtains an image from a camera located on an autonomous vehicle while the autonomous vehicle is being driven.

At the determining operation 302, the PIP module determines a location of the autonomous vehicle in a terrain map. The terrain map provides 3D world coordinates of various points in a spatial region where the autonomous vehicle is being driven so that the location of the autonomous vehicle can be characterized with 3D world coordinates. The location of the autonomous vehicle in a terrain map may be based on or may be the same as a real-time position of the autonomous vehicle. In some embodiments, the PIP module obtains the real-time position information from a GPS device in the autonomous vehicle. The PIP module can use the real-time position information of the autonomous vehicle to determine or identify the location of the autonomous vehicle on the terrain map. The location and/or real-time position of the vehicle is associated with a spatial region in which or where the autonomous vehicle is being driven, and the location of the autonomous vehicle is associated with a time when the image is obtained by a camera 102.

At the selecting operation 304, the PIP module can select a reference point in the image that corresponds to a pre-determined distance from the location of the autonomous vehicle. For example, a reference point can correspond to a point in a spatial region that is located at a pre-determined distance of 750 meters in front of the location of autonomous vehicle. The front of the autonomous vehicle can be an area towards which the autonomous vehicle is being driven. In some embodiments, a reference point can be located to the side of the autonomous vehicle. In some other embodiments, a reference point can be located in a region to the rear of the autonomous vehicle and away from which the autonomous vehicle is being driven.

In some embodiments, at the selecting operation 304, the PIP module can use the terrain map and the location of the autonomous vehicle to obtain a 3D world coordinates of the selected reference point. Thus, in the example described above, the 3D coordinates of a reference point that is 750 meters in front of the vehicle can be first determined by using the terrain map and a localization technique based on the location of the autonomous vehicle. Next, as further described in the determining operation 306 below, the location of the reference in the image obtained by the camera can be determined by using camera intrinsic and extrinsic matrices. In some embodiments, the PIP module can select a reference point to be past a pre-determined in front of the location of the autonomous vehicle. In some embodiments, the PIP module can select a reference point to be within a range of pre-determined distances in front of the location of the autonomous vehicle.

At the determining operation 306, the PIP module determines a position (e.g., coordinates of the pixel) of the reference point on the two-dimensional (2D) original image by projecting the 3D world coordinates of the reference point to the 2D original image. The PIP module may project the 3D world coordinates of the reference point to the 2D original image by using the camera pose information of the original image obtained from the vehicle location and camera pose estimation module 108 (in FIG. 1). The camera pose information can include a camera extrinsic matrix that describe the location and/or orientation of a camera with respect to a world frame, where a camera extrinsic matrix represents the position of the camera center in the world coordinates. Thus, for example, the 3D world coordinates of the reference point can be multiplied by the camera extrinsic matrix to obtain a point in image plane, and then, the 2D coordinates of the point in the image space is obtained by using the perspective projection equations, $x=f(X/Z)$ and $y=f(Y/Z)$, where x and y are the 2D coordinates of the point, and X, Y, and Z are the camera coordinates of the point.

The camera pose information can characterize the optical properties, camera orientation, and/or location of the camera that obtained the image at the obtaining operation 301. The camera pose information can include a camera intrinsic matrix to characterize, for example, the optical, geometric, and/or digital characteristics of the camera. The vehicle location and camera pose estimation module 108 can generate or obtain the camera pose information based one or more previous cropped images received by the vehicle location and camera pose estimation module 108 prior to the performance of the determining operation 306 (or prior to the determining operation 356 of FIG. 3B) by the PIP module 104.

At the cropping operation 308, the PIP module crops a portion of the obtained image corresponding to a region of interest, where the region of interest is identified based on the determined position of the reference point on the original image. For example, the position of the reference point on the original image determined at the selecting operation 304 is used as a center point so that the PIP module can crop from the original image a region having a resolution less than (e.g., half of) the resolution of the original image, where the position of the reference point is at the center of the region cropped from the original image.

FIG. 3B shows a flowchart of a second exemplary technique to select a region of interest to crop from an image by using at least two reference points. In the exemplary technique of FIG. 3B, the PIP module can select a plurality of reference points to determine the size of the cropped portion of the image. At the obtaining operation 351, the PIP module obtains an image from a camera located on an autonomous vehicle as the autonomous vehicle is being driven. At the determining operation 352, the PIP module determines a location of the autonomous vehicle in a terrain map as described for the determining operation 302 of FIG. 3A.

At the selecting operation 354, the PIP module can select two reference points located at two pre-determined distances from the location of the autonomous vehicle. As an example, a first reference point and a second reference point can correspond to points in a spatial region that are located at pre-determined distances of 1000 meters and 500 meters, respectively, in front of the location of autonomous vehicle. The front of the autonomous vehicle can be an area towards which the autonomous vehicle is being driven. In some embodiments, the two reference points can be located to the side of the autonomous vehicle. In some other embodiments, the two reference points can be located in a region to the rear of the autonomous vehicle and away from which the autonomous vehicle is being driven. Thus, the pre-defined region of interest can have an upper bound at 1000 meters and a lower bound at 500 meters. At the selecting operation 354, the PIP module can use the terrain map and the location of the autonomous vehicle to obtain the 3D world coordinates of the two selected reference points as explained for the selecting operation 304 of FIG. 3A.

At the determining operation 356, the PIP module determines positions (e.g., coordinates of the pixels) of the two reference points on the 2D original image by projecting the 3D world coordinates of the two reference points to the 2D original image. The PIP module may project the 3D world coordinates of the two reference points to the 2D original image by using the camera pose information of the original image as described for the determining operation 306 of FIG. 3A.

At the cropping operation 358, the PIP module crops a portion of the obtained image corresponding to a region of interest, where the region of interest is identified based on the determined positions of the two reference points on the original image. The two reference points correspond to a first distance and a second distance from the location of the autonomous vehicle, where the first distance can be associated with upper bound location of the region of interest and the second distance can be associated with lower bound location of the region of interest. The PIP module can use the position of the two reference points on the original image and a pre-defined left bound position and a pre-defined right bound position to obtain a cropping bound or a cropping area of a region of interest. Thus, the PIP module can use the cropping bound to crop a region of interest without being sensitive to the left bound position and the right bound position of the region of interest. In some embodiments, the cropping bound or the cropping area may be a box, such as a rectangle or a square. In some embodiments, the cropping bound or a cropping area may be circular or some other symmetrical or asymmetrical shape. In some embodiments, the operations described in FIGS. 3A and 3B are performed in real-time by an onboard computer in the autonomous vehicle while the autonomous vehicle is being driven.

In some embodiments of the methods described in FIGS. 3A and 3B, the selecting of the one or more reference points comprises obtaining three-dimensional world coordinates of the one or more reference points based on the terrain map and the location of the vehicle. In some embodiments of the methods described in FIGS. 3A and 3B, the one or more positions of the one or more reference points on the obtained image are determined by projecting the three-dimensional world coordinates of the one or more reference points to the image by using a camera pose information associated with the obtained image, and the camera pose information characterizes optical properties, orientation, or location of the camera.

In some embodiments of the methods described in FIGS. 3A and 3B, a position of a single reference point on the obtained image is a center point of the region of interest, and the cropped portion has a first resolution that is less than a second resolution of the obtained image.

In some embodiments of the methods described in FIGS. 3A and 3B, two positions of two reference points on the obtained image respectively correspond to a first distance and a second distance from the location of the vehicle. In some embodiments of the methods described in FIGS. 3A and 3B, the obtained image is from a first region towards which the vehicle is being driven, or the obtained image is from a second region to a side of the vehicle, or the obtained image is from a third region away from which the vehicle is being driven.

In some embodiments of the methods described in FIGS. 3A and 3B, operations associated the obtaining the image, the obtaining the location of the vehicle, the selecting the one or more reference points, the determining the one or more positions, and the cropping the portion of the obtained image are performed in real-time while the vehicle is being driven.

In some embodiments of the methods described in FIGS. 3A and 3B, the one or more pre-determined distances include 500 meters, 750 meters, or 1000 meters. In some embodiments of the methods described in FIGS. 3A and 3B, the vehicle is an autonomous semi-trailer truck so that a computer onboard the autonomous semi-trailer truck can perform operations described in FIGS. 3A and/or 3B to crop a portion of the obtain image so that the semi-trailer truck can be operated autonomously based on the information obtained from the cropped image.

In some embodiments of the methods described in FIGS. 3A and 3B, the regions of interest (e.g. ramp, or intersection) can be pre-defined in the terrain map, so that the 3D world coordinates of the bound of the regions of interest can also be pre-determined. In such embodiments, when the real-time position information of the autonomous vehicle indicates that the autonomous vehicle is near within a pre-determined distance of one of the regions of interest, the bounds of the region in image can be computed based on the camera pose information and the 3D world coordinates of the bounds of the region.

In some embodiments of the methods described in FIGS. 3A and 3B, the PIP module can apply a smoothing technique to stabilize the cropped images since in some cases, the cropped images may be temporally unstable. An unstable cropped image may be visually blurry or may be affected by vibration or jitter. To improve image processing, the PIP module can apply a smoothing technique to stabilize the cropped images.

The PIP module crops the original image for several beneficial technical reasons. First, by having the PIP module crop the original image, the onboard computer's computational resources are more efficiently used to process regions of interest in the image rather than to process the entire image. For autonomous driving, the runtime speed of various computational operations can be important. Thus, the runtime of the algorithms that perform the various computations should be maintained in a small range and cannot be too large. Second, in an autonomous driving context, the onboard computer may not adequately perform computations or image processing in real time on high-resolution images (e.g., 1024×576 pixels or 2048×1152 pixels) taken at a high frame rate (e.g., 20 or more FPS).

Third, by cropping the region(s) of interest to a lower resolution (e.g., 512×288 pixels), the PIP module can preserve as much information from the original image so that a detection module 110 can process the cropped region(s) of interest to perceive small objects such as those located up to 1000 meters from the location of the autonomous vehicle. When an original image is simply resized, some of the information from the original image may be lost. As a result, when a detection module 110 processes the resized image, it may not be able to perceive small objects such as those located up to 1000 meters from the location of the autonomous vehicle. Thus, a benefit of the cropping technique described for the PIP module is that the cropped region(s) of interest can be considered to be resized without losing much information from the original images at least because the resolution of the cropped region(s) of interest are usually less than the resolution of the original image.

Fourth, for a given image from a camera, there may many regions that are not relevant for image processing in an autonomous driving context. For example, in FIG. 4B, the only relevant portion of the original image may be the cropping area 404 that includes the road and objects on the road. Thus, several of the image processing techniques described in some embodiments may be performed only in a region of interest indicated by a cropping area 404 and not on the regions that include the trees and/or the sky in FIG. 4B. Thus, the PIP module can allow the remaining modules shown in FIG. 1 to more efficiently perform their respective image processing techniques for autonomous driving.

Figure 4A:
FIGS. 4A to 4D show several scenarios where a picture-in-picture feature can be used to select and crop regions of interest.
Figure 4B:

FIGS. 4A to 4D show several scenarios where a picture-in-picture feature can be used to select and crop regions of interest. FIG. 4A shows an original image with a selected cropping area 402 of a region of interest, where the region of interest is considered to be located at a long-distance range relative to a location of an autonomous vehicle (e.g., between 500 meters to 1000 meters in front of the autonomous vehicle). FIG. 4B shows an original image with a selected cropping area 404 of a region of interest, where the region of interest is located on one side of a crossroad or intersection. The original image is obtained by a camera that can obtain images on one side to on one of the sides of the autonomous vehicle. When the autonomous vehicle approaches the crossroad or intersection, the PIP module can select the cropping area 404 to crop a region(s) of interest that may be related to a route of the autonomous vehicle. Thus, the cameras mentioned in some embodiments may be located on or in an autonomous vehicle to obtain images in front of or to the rear of or to the sides of the autonomous vehicle.

Figure 4C:
Figure 4D:

FIG. 4C shows an original image with a selected cropping area 406 of a region of interest, where the region of interest is located to include a merge-in or merge-out ramp on the highway that is approached by the autonomous vehicle. The PIP module can crop the cropping area 406 so that the detection module 110 (further described in Section I.(c)) and/or the depth estimation module 112 (further described in Section I.(e)) can more effectively perceive objects on the on-ramp. FIG. 4D shows an original image with a selected cropping area 408 of a region of interest, where the region of interest is located on a portion of a curved road.

c. Image Processing by Detection Module

As shown in FIG. 1, the exemplary long-distance perception system includes a detection module 110 that receives one or more cropped images of one or more regions of interest from the PIP module 104. In some embodiments, the term "cropped image" or "cropped region" refers to a cropped portion of an image obtained from a camera. The detection module 110 employs machine learning techniques to detect objects in the cropped image(s) provided by the PIP module 104 and to place a bounding box around each detected object in the cropped image(s). For example, the detection module 110 may detect one or more objects in the cropped portion of the image by using deep learning neural network through which data related to each cropped portion passes, where the deep learning neural network may include an input neural network layer, two or more hidden neural network layers, and an output neural network layer. In this patent document, the term "bounding box" or any type of bounding may include a four cornered geometric shape or a circular shape or any symmetrical or asymmetrical shape.

The detection module 110 receives a cropped image as an input and outputs one or more bounding boxes for each object that the detection module 110 detects. For example, the deep learning neural network of the detection module 110 can identify in the cropped image several types of objects, such as a car, a truck, a truck-trailer, a semi-truck, an emergency vehicle, a pedestrian, a motorcycle, or an obstacle on the road. The deep learning neural network can also add a bounding box around each identified object in the cropped image, where the bounding box represents a location of a corresponding detected object in the cropped image obtained from the PIP module 104. Examples of a bounding box includes a cube, a square, a cuboid, or a rectangle.

The detection module 110 can perform image processing on real-time image feeds from on-vehicle cameras to detect objects present in the real-time image feeds. The detection module 110 can also preserve spatial information of detected objects in different image regions of the real-time image feeds at least because different cameras may get detection results for a single object. As a result, the information of the detection results and their projection results can be preserved. As further described in Section I.(e)., a depth estimation module 112 (shown in FIG. 1) can receive from the detection module 110 information related to the one or more bounding boxes. For each bounding box the depth estimation module 112 can determine a position of a detected object in an image.

In some embodiments, segmentation techniques can be used to detect an object and obtain bounding box information for the detected object. Exemplary segmentation techniques are described in U.S. Patent Publication Nos. 2018/0336421 and 2018/0365835. The content of these documents is incorporated by reference in its entirety in this patent document.

d. Information Provided by Vehicle Location and Camera Pose Estimation Module

In FIG. 1, the exemplary long-distance perception system includes a vehicle location and camera pose estimation module 108 that can generate or obtain camera pose information based on a cropped image received from the PIP module 104. As shown in FIG. 1, the vehicle location and camera pose estimation module 108 sends the camera pose information for a current cropped image to the depth estimation module 112. The vehicle location and camera pose estimation module 108 can also feedback the camera pose information for a current cropped image to the PIP module 104 so that the PIP module 104 can use the camera pose information for the next cropped image obtained by the PIP module 104 as described in Section I.(b) above. As explained in Section I.(b) above, the camera pose information can include an intrinsic camera matrix and/or an extrinsic camera matrix. The vehicle location and camera pose estimation module 108 can also compute an accurate location of the autonomous truck and can provide this information to the PIP module 104.

e. Image Processing by Depth Estimation Module

An autonomous vehicle can detect and locate the position of objects (e.g., vehicles, pedestrians, obstacles) that surround the autonomous vehicle so that the autonomous vehicle can safely drive around or with such objects. In FIG. 1, the exemplary long-distance perception system includes a depth estimation module 112 that can compute a 3D position in world coordinates of objects detected by the detection module 110. Thus, the depth estimation module 112 can determine and/or generate an estimate of a corresponding 3D position for each object perceived in the cropped image by the detection module 110.

Figure 5:
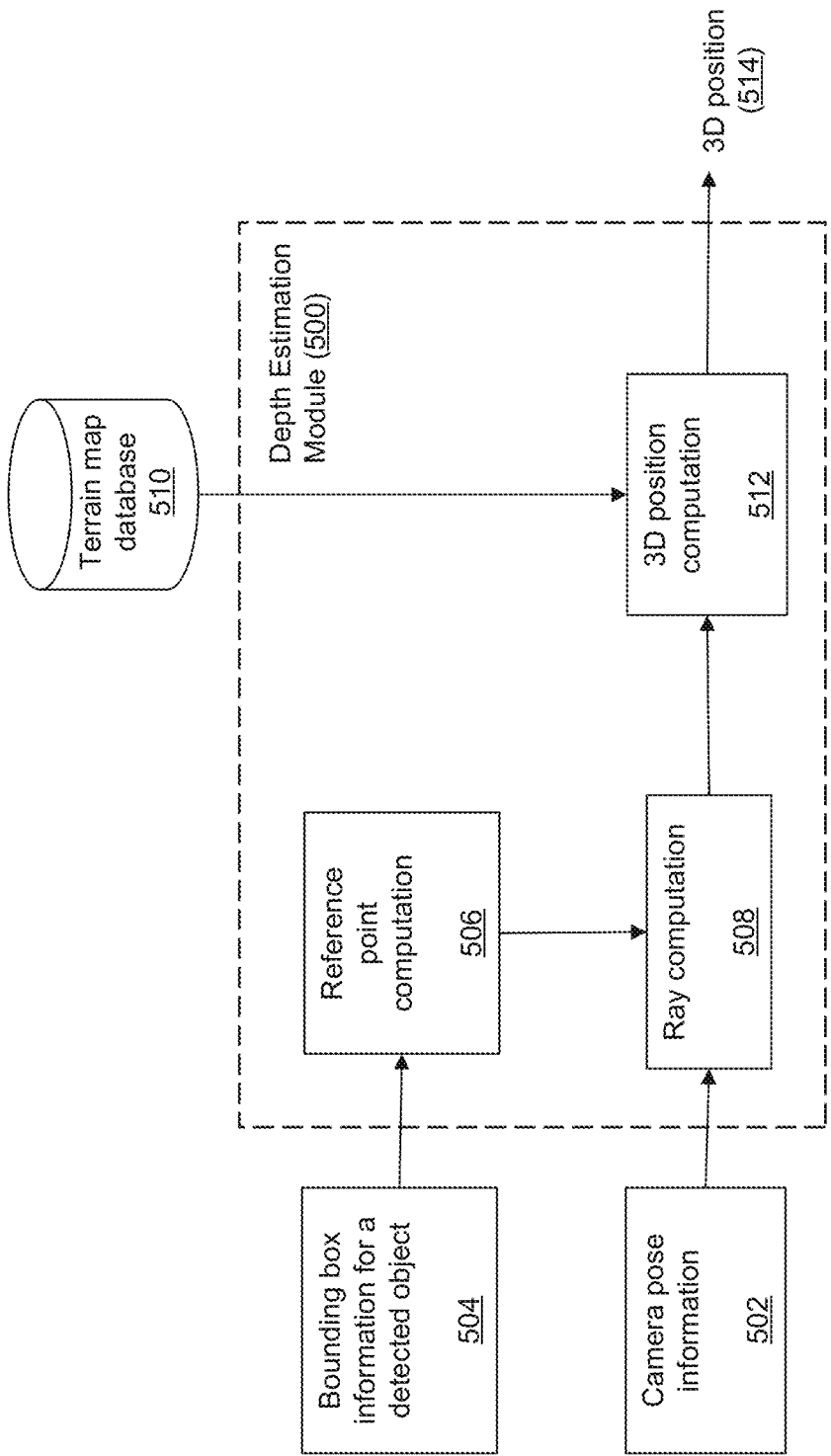
FIG. 5 further describes the operations performed by a depth estimation module of the long-distance perception system.

FIG. 5 further describes the operations performed by a depth estimation module of the long-distance perception system. The depth estimation module 500 can perform its operations based on terrain map information, camera pose information and bounding box information of a detected object. Based on the data received, the depth estimation module 500 can output an estimate of the 3D position 514 for one or more detected objects in the cropped image. In some embodiments, the depth estimation module 500 may receive images from a camera with bounding box information without having the images being cropped by the PIP module 200. Thus, the techniques described in this depth estimation section I.(e). in the context of a cropped image can be used to determine the 3D position of one or more points of the bounding box around an object located in an original uncropped image received by the depth estimation module 500 from the camera.

Since an original image or a cropped image may be associated with distances between 500 meters and 1000 meters (as described in Section I.(b)), the detected object in the original or cropped image may also be located at a distance between 500 meters and 1000 meters from the location of the autonomous vehicle. In some embodiments, the detected object in an original or cropped image can be located at a distance of up to, including, and further than 1000 meters.

Figure 6:
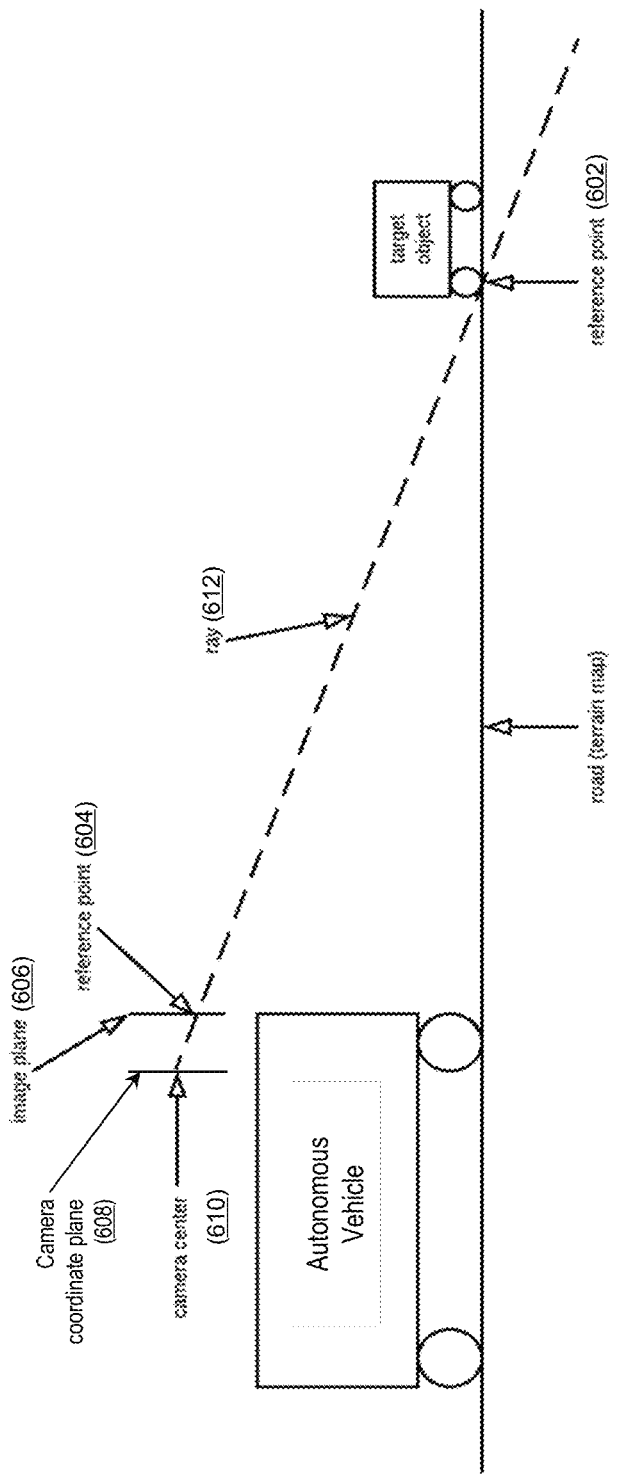
FIG. 6 shows a ray from a target object being received by a camera on an autonomous vehicle.

The depth estimation module 500 performs a reference point computation 506 based on bounding box information 504 received for each detected object in the cropped image, where the bounding box information 504 is received from the detection module (110 in FIG. 1). The bounding box information 504 may include the image plane positions of the vertices located at the corners of the bounding box. Based on the positions of the vertices, the depth estimation module 500 can determine or can obtain one or more positions of one or more reference points on the bounding box. As shown in FIG. 6, a reference point 602 can be a point on a target object such as one of the rear tires of a target object that is in contact with a road surface or a point in between the two rear tires of the target object. For example, the reference point 602 can be the midpoint in between two vertices of the bottom line of the bounding box that surrounds the detected object. In some embodiments, a reference point 602 can be a point on the bottom line of a bounding box that surrounds the detected object. The 3D position of the reference point 602 of a target object can correspond to the location of that vehicle. Thus, as further described in this section, the depth estimation module 500 can determine the 3D position of one or more reference points of a given bounding box to obtain an estimate of a location of a target or detected object. The depth estimation module 500 may use several kinds of reference points to determine an estimate of a 3D position of a given bounding box. For example, the depth estimation module 500 may use the contact points of the four tires of a vehicle with the road surface, or a center bottom point of the four contact points, or a center of the two contact points of the rear tire(s) with the road surface.

The depth estimation module 500 performs reference point computation 506 by calculating a position of a reference point in the image plane. For example, the position (x, y) of a reference point 604 in FIG. 6 on a cropped image can be as follows:

$$x = \text{mean}(x1, x2)$$

$$y = \text{mean}(y1, y2)$$

where [x1, y1, x2, y2 ...] is the given bounding box in the image plane 606, where (x1, y1) can refer to the bottom left of the bounding box, (x2, y2) can refer to the bottom right of the bounding box, and the position (x, y) can describe the center of two contact points of the rear tires with the road surface.

The depth estimation module 500 performs a ray computation 508 based on the camera pose information 502 and based on the received position (x, y) of a reference point from the reference point computation 506. The camera pose information 502 is received from the vehicle location and camera pose estimation module (108 in FIG. 1). The camera pose information 502 includes camera intrinsic matrix, camera extrinsic matrix, and/or camera distortion. The camera intrinsic and extrinsic matrices are provided in real-time for each image provided by the camera because the camera matrices may be different from one image to another image. The camera intrinsic matrix characterizes the optical properties and the camera extrinsic matrix characterizes camera orientation, and/or location of the camera, which may be different between images as the camera experiences vibrations and/or other real-world effects on an autonomous vehicle. Thus, a benefit of providing camera intrinsic and extrinsic matrices in real-time for each image is that such information can be used by the depth estimation module 110 to eliminate the influence of vibrations of cameras when the autonomous vehicle is being driven, which can lead to a more precise 3D position estimation.

The depth estimation module 500 perform ray computation 508 to determine the camera coordinates of a reference point position (x, y) through which a ray 612 passes based on camera intrinsic matrix. As shown in FIG. 6, the camera coordinates describe points on a camera coordinate plane 608, where the points include a camera center, where the camera coordinate plane is located at a focal length distance behind or away from the image plane 606, where the focal length describes the optical property of the lens(es) of a camera, and where the camera coordinate plane 608 can be parallel to the image plane. As shown in FIG. 6, a reference point 604 on an image corresponding to a ray 612 in 3D space or in 3D world coordinate. The depth of different points on the ray 612 relative to the image plane 606 corresponds to different points in 3D world coordinate space. The starting point of the ray 612 is the camera center (shown in FIG. 6 as 610) which can mean that all points on the ray in 3D world coordinate are represented by a same point in the image plane 606, where a point in the image plane 606 in camera coordinates represents a corresponding ray 612 in 3D world coordinate. Thus, the depth estimation module 500 perform ray computation 508 to determine the camera coordinates of the reference point position (x, y) through which the ray 612 passes by using camera intrinsic matrix. At the ray computation operation 508, the depth estimation module 500 transfers or converts the determined camera coordinate of the reference point position (x, y) to 3D world coordinate by using camera extrinsic matrix.

The depth estimation module 500 performs a 3D position computation 512 to determine a point of intersection of the ray with the road surface. If the reference point on the ray is the reference point position (x, y), the reference point can be considered to be the point where an object is in contact with or closest to the road surface. As further explained below, the 3D position computation 512 receives terrain map information from the terrain map database 510, where the terrain map information provides a 3D position information of each point on the road surface on which or near which the autonomous vehicle is being driven.

The depth estimation module 500 performs 3D position computation 512 in one of several ways to find a point of intersection between the reference point position (x, y) and the road surface. For example, the depth estimation module 500 can sample or obtain several points on the ray in 3D world coordinates. For each sampled point, the depth estimation module 500 can find a 3D world coordinate of corresponding road surface point by using the 3D world coordinates of the sampled point along with the terrain map information from the terrain map database 510. The depth estimation module 500 calculates the height difference between the world coordinate of each sampled point and the world coordinate of its corresponding road surface point in terrain map. Next, the depth estimation module 500 determines the sampled point having a minimum height difference. The 3D world coordinates of the sampled point having a minimum height difference are considered to be the same as the 3D world coordinates of the point of intersection between the reference point position (x, y) and the road surface. The 3D world coordinates of the point of intersection determined by the depth estimation module 500 can be considered to be an estimate of the 3D position of a detected object in a spatial region that includes the autonomous vehicle.

In some embodiments, the reference point position can be determined by computing a point of intersection between the reference point position (x, y) and the road surface. In such embodiments, a terrain surface (g(x, y)) of a terrain that surrounds the location of the autonomous vehicle is determined, and a point of intersection is determined mathematically by finding the intersection of the ray (f (x, y)) and the fitted terrain surface (g(x, y)). In such embodiments, a ray passes through the camera center point and a reference point position (x, y), where 3D world coordinates of two or more points on the ray can be used to determine a mathematical function f that describes the ray. Another function g can represent a plane or a surface that includes two or more terrain points surrounding the target object (shown in FIG. 6). In some embodiments, the 3D world coordinates of the terrain points can be obtained from the bounding box that surrounds the target object. For example, the depth estimation module 500 can determine the 3D world coordinates of the terrain points below the target object by determining from the bounding box information 504 two or more reference points located on a line of the bounding box closest to the surface of the road (e.g., the reference points along the base of a rectangular bounding box or a square bounding box).

The depth estimation module 500 can perform 3D position computation 512 of a point of intersection of the ray and the fitted terrain surface (g(x, y)) by finding the mathematical solution of the intersections of the two functions f and g. The depth estimation module 500 can determine or obtain from the terrain map the 3D world coordinates of the point of intersection. The depth estimation module 500 determines that 3D world coordinates of the reference point position is the same as the 3D world coordinates of the point of intersection of the two mathematical functions f and g. Thus, the 3D world coordinates of the point of intersection can be considered to be an estimate of the 3D position of a detected object in a spatial region that includes the autonomous vehicle.

The techniques described in this depth estimation section I.(e). can be used to determine the 3D position of other points of the bounding box. For example, the depth estimation module 500 can determine the 3D position of rear left and right tires, corresponding to the rear left and right vertices of the bounding box. In another example, if a bounding box is a cube or cuboid, the techniques described in this depth estimation section I.(e). can be used to compute the 3D position of all four bottom vertices of the bounding box that are closest to the road surface. In some embodiments, ray computation 508 can determine reference point position (x, y) through which a ray passes by taking into account camera distortion information (e.g., camera distortion coefficients) provided by the camera pose information.

Figure 7:
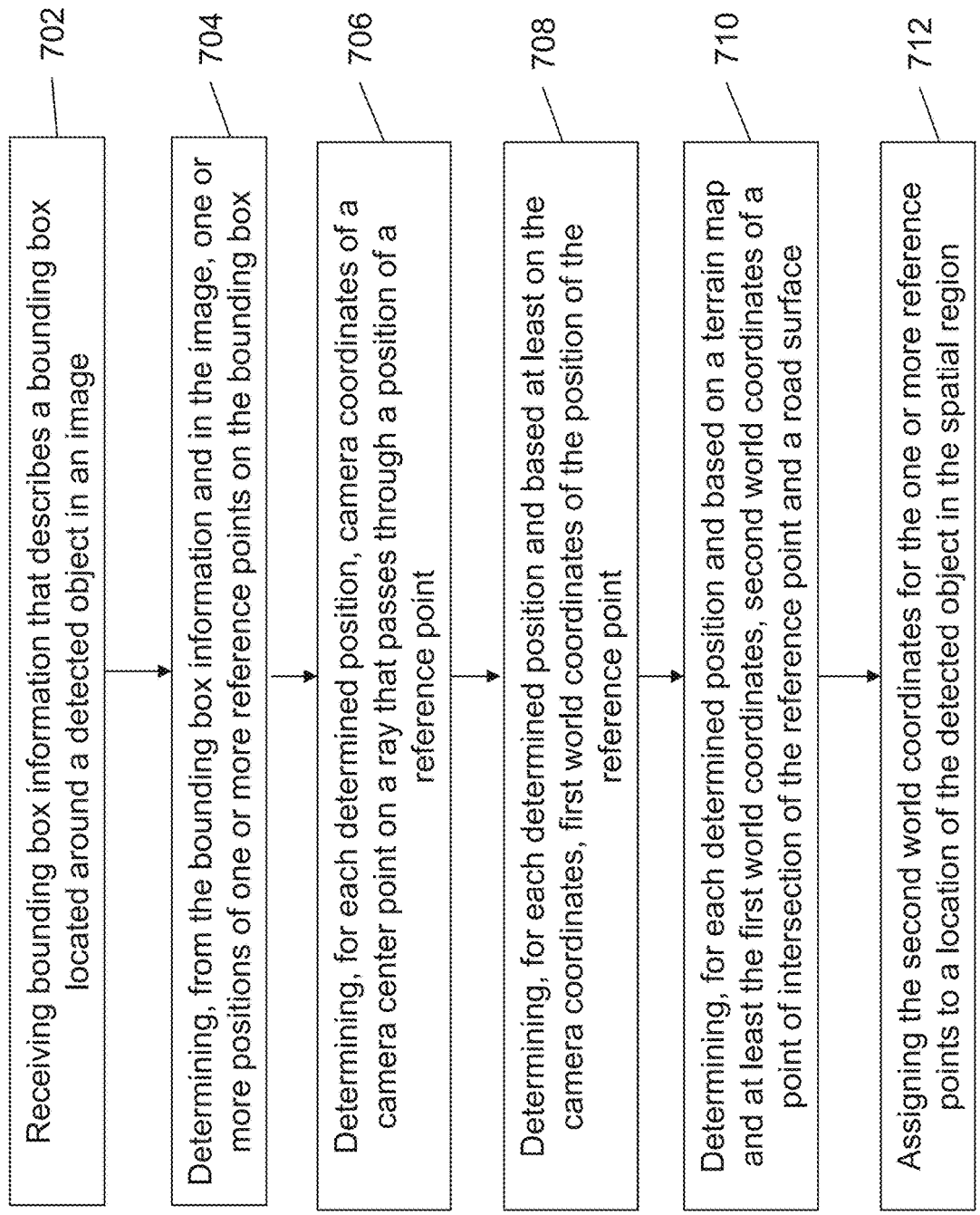
FIG. 7 shows a flowchart of an exemplary technique to identify 3D position of one or more reference points on a bounding box of a detected object.

FIG. 7 shows a flowchart of an exemplary technique to identify 3D position of one or more reference points on a bounding box of a detected object. At the receiving operation 702, the depth estimation module receives bounding box information that describes a bounding box located around a detected object in an image, where the bounding box information is received while the vehicle is being driven. In some embodiments, the image is cropped from a second image received from a camera located on a vehicle, and the image is cropped while the vehicle is being driven. At the determining operation 704, the depth estimation module determines, from the bounding box information and in the image, one or more positions of one or more reference points on the bounding box.

The depth estimation module performs operations 706 to 710 for each determined position of each reference point. At the determining operation 706, the depth estimation module determines camera coordinates of a camera center point on a ray that passes through a position of a reference point. The camera center point is located on a camera coordinate plane located at a focal length distance away from an image plane where the image is received. At the determining operation 708, the depth estimation module determines, based at least on the camera coordinates, first world coordinates of the position of the reference point. At the determining operation 710, the depth estimation module determines, based on a terrain map and at least the first world coordinates of the position of the reference point, second world coordinates of a point of intersection of the reference point and a road surface. The terrain map provides coordinates of points in a spatial region where the vehicle is being driven.

At the assigning operation 712, the depth estimation module assigns the second world coordinates for each of the one or more reference points to a location of the detected object in the spatial region.

In some embodiments of the method described in FIG. 7, the second world coordinates of the point of intersection is determined by: obtaining a first set of points along the ray, where the reference point belongs to the first set of points, determining a first set of world coordinates corresponding to the first set of points, where the first world coordinates belongs to the first set of world coordinates, determining, based on the terrain map and corresponding to the first set of points, a second set of points on the road surface, determining a second set of world coordinates corresponding to the second set of points, determining plurality of heights between each point associated with the first set of world coordinates and a corresponding point associated with the second set of world coordinates, determining a minimum height from the plurality of heights, identifying a point from the second set of points associated with the minimum height, and obtaining world coordinates of the point, where the second world coordinates are determined to be same as the world coordinates of the point.

In some other embodiments of the method described in FIG. 7, the second world coordinates of the point of intersection is determined by determining a first mathematical function that describes the ray, determining, based on the terrain map, world coordinates of two or more points on the bounding box, determining a second mathematical function that describes a plane that includes the two or more points, determining an intersection of the first mathematical function and the second mathematical function, and obtaining world coordinates of the intersection, where the second world coordinates are determined to be same as the world coordinates of the intersection. In some embodiments of the method described in FIG. 7, the second world coordinates of the point of intersection is determined by determining an intersection of the ray and two or more points on the bounding box, and obtaining world coordinates of the intersection, where the second world coordinates are determined to be same as the world coordinates of the intersection.

In some embodiments of the method described in FIG. 7, the bounding box includes a plurality of vertices located at a plurality of corners of the bounding box, the one or more reference points includes a reference point located midpoint in between two vertices of the bounding box, and the two vertices are closest to a surface of a road compared to other vertices of the bounding box. In some embodiments of the method described in FIG. 7, a camera intrinsic matrix is used to determine the camera coordinates of the camera center point in the camera coordinate plane, and a camera extrinsic matrix is used with the camera coordinates to determine the first world coordinates of the reference point.

In some embodiments of the method described in FIG. 7, the detected object includes a car, a truck, a truck-trailer, a semi-truck, an emergency vehicle, a pedestrian, a motorcycle, or an obstacle on a road. In some embodiments of the method described in FIG. 7, the detected object includes another vehicle. In some embodiments of the method described in FIG. 7, the vehicle is an autonomous semi-trailer truck so that a computer onboard the autonomous semi-trailer truck can perform operations described in FIG. 7 to determine a location of an object in a spatial region where the semi-trailer truck is being driven so that the semi-trailer truck can be operated autonomously based on the location of the object.

In some embodiments of the method described in FIG. 7, the image is from a first region towards which the vehicle is being driven, or where the image is from a second region to a side of the vehicle, or where the image is from a third region away from which the vehicle is being driven. In some embodiments of the method described in FIG. 7, operations associated the receiving the bounding box information, the determining the one or more positions, the determining the camera coordinates, the determining the second world coordinates, and the assigning the second world coordinates are performed in real-time while the vehicle is being driven. In some embodiments of the method described in FIG. 7, the detected object in the image is located at a distance between 500 meters and 1000 meters.

In some embodiments, as described in this depth estimation section I.(e)., the reference point from the 2D image plane is projected to 3D space and the point of intersection of the projected ray and the road surface is determined. In some embodiments, the depth estimation module can project the 3D terrain points to the 2D image plane and find the closet terrain point with the reference point as the 3D position of the reference point. Both these methods may use a single camera and the terrain map to perform 3D position estimation.

A benefit of the image processing techniques described for the depth estimation module is that image processing is performed on images received from cameras, instead of from other kinds of sensors (e.g., LiDAR) that tend to be more expensive than cameras. As a result, the depth estimation module can help keep cost of autonomous vehicle system low. Another benefit of the depth estimation module is that since it can receive cropped images that describe locations of around 1000 meters in front of the autonomous vehicle, the depth estimation module can estimate a 3D position of objects located within a radius of around 1000 meters or even further. Thus, the depth estimation module can facilitate long distance perception of an autonomous vehicle. Another benefit of the depth estimation module that it can perform computations in a relatively short time period since the computations tend to be few. By keeping the computation time to a minimum, the depth estimation module can perform image processing in real-time as the autonomous vehicle is being driven.

Figure 8:
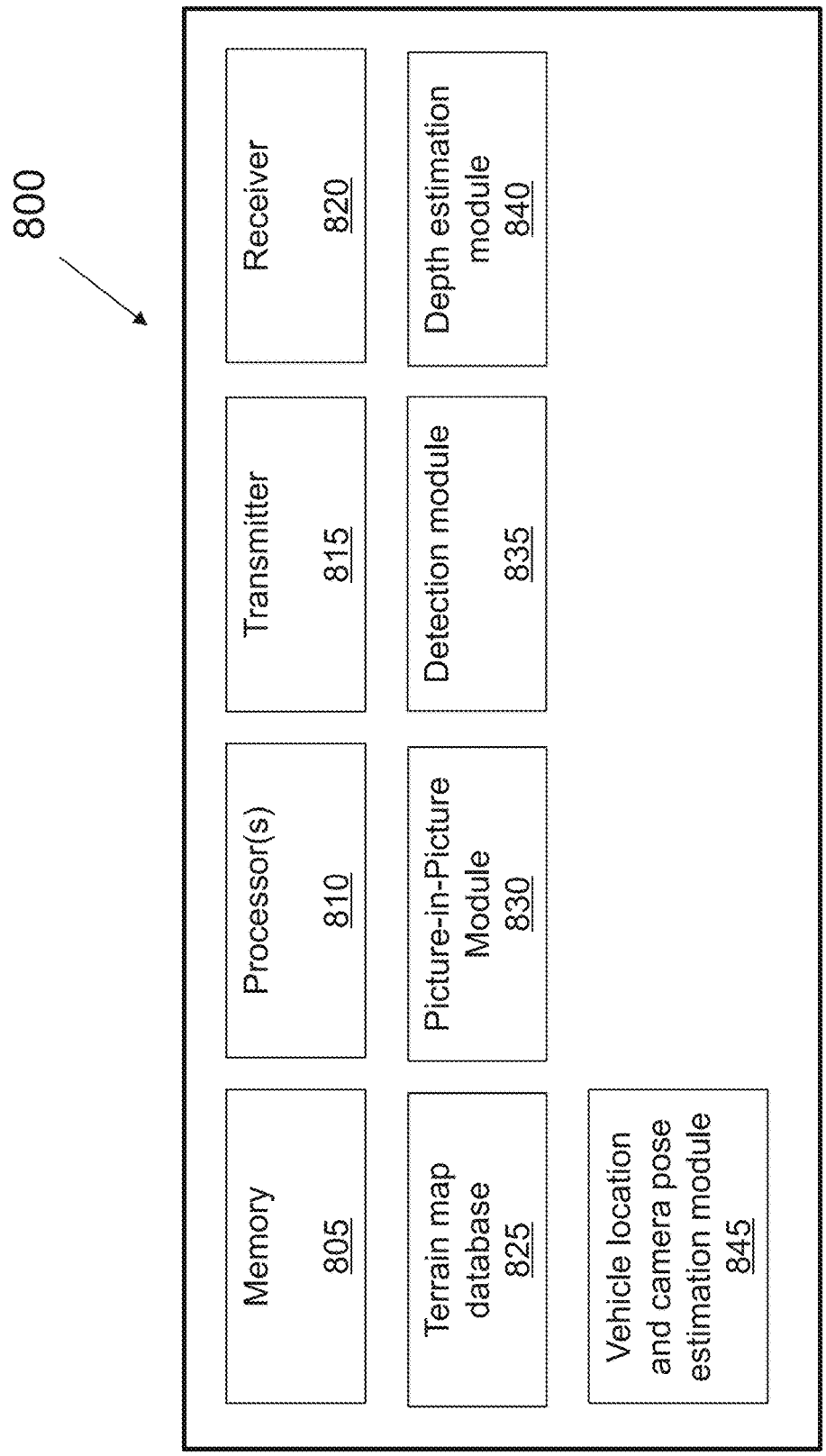
FIG. 8 shows an exemplary block diagram of a computer or server included in an autonomous vehicle.

FIG. 8 shows an exemplary block diagram of a computer or server 800 included in an autonomous vehicle. The computer 800 includes at least one processor 810 and a memory 805 having instructions stored thereupon. The instructions upon execution by the processor 810 configure the computer 800 to perform the operations described for the various modules as described in FIGS. 1 to 7 and 9 to 11, and/or the operations described in the various embodiments or sections in this patent document.

Figure 9:
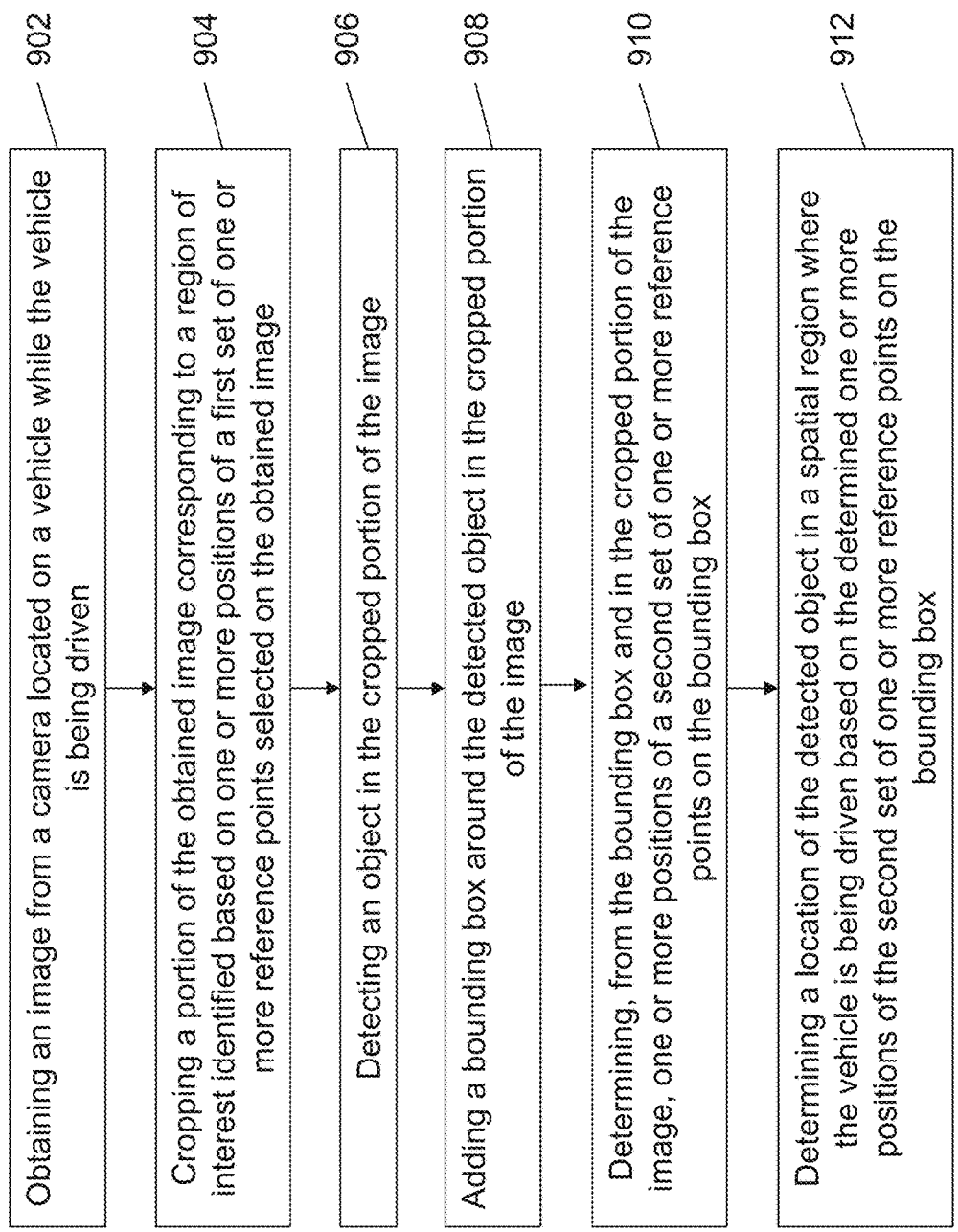
FIG. 9 shows a flowchart of an exemplary technique to crop a portion of an image, detect and add a bounding box around an object in the cropped portion, and identify 3D position of one or more reference points on the bounding box of a detected object.

FIG. 9 shows a flowchart of an exemplary technique to crop a portion of an image, detect and add a bounding box around an object in the cropped portion, and identify 3D position of one or more reference points on the bounding box of a detected object. At the obtaining operation 902, an image is obtained from a camera located on a vehicle while the vehicle is being driven.

The cropping operation 904 includes cropping a portion of the obtained image corresponding to a region of interest identified based on one or more positions of a first set of one or more reference points selected on the obtained image. In some embodiments, the first set of one or more reference points are selected by obtaining three-dimensional world coordinates of the first set of one or more reference points based on a terrain map and a location of the vehicle, where the terrain map provides coordinates of points in the spatial region where the vehicle is being driven. In some embodiments, the one or more positions of the first set of one or more reference points on the obtained image are determined by projecting the three-dimensional world coordinates of the first set of one or more reference points to the image by using a camera pose information associated with the obtained image, and the camera pose information characterizes optical properties, orientation, or location of the camera.

In some embodiments, a position of a single reference point of the first set on the obtained image is a center point of the region of interest, and the cropped portion has a first resolution that is less than a second resolution of the obtained image. In some embodiments, two positions of two reference points of the first set on the obtained image respectively correspond to a first distance and a second distance from the location of the vehicle.

At the detecting operation 906, an object is detected in the cropped portion of the image. In some embodiments, the object is detected in the cropped portion of the image based on machine learning techniques. At the adding operation 908, a bounding box is added around the detected object in the cropped portion of the image.

The determining operation 910 includes determining, from the bounding box and in the cropped portion of the image, one or more positions of a second set of one or more reference points on the bounding box. In some embodiments, the bounding box includes a plurality of vertices located at a plurality of corners of the bounding box, the second set of one or more reference points includes a reference point located midpoint in between two vertices of the bounding box, and the two vertices are closest to a surface of a road compared to other vertices of the bounding box.

The determining operation 912 includes determining a location of the detected object in a spatial region where the vehicle is being driven based on the determined one or more positions of the second set of one or more reference points on the bounding box. In some embodiments, the location of the detected object is determined by performing operations 912(a) to 912(c) for each determined position of each reference point of the second set. The determining operation 912(a) includes determining camera coordinates of a camera center point located on a ray that passes through a position of a reference point, where the camera center point is located on a camera coordinate plane located at a focal length distance away from an image plane where the image is received. In some embodiments, a camera intrinsic matrix is used to determine the camera coordinates of the camera center point in the camera coordinate plane, and a camera extrinsic matrix is used with the camera coordinates to determine the first world coordinates of the reference point.

The determining operation 912(b) includes determining, based at least on the camera coordinates, first world coordinates of the position of the reference point. The determining operation 912(c) includes determining, based on a terrain map, second world coordinates of a point of intersection of the reference point and a road surface, where the terrain map provides coordinates of points in a spatial region where the vehicle is being driven.

In some embodiments, the second world coordinates of the point of intersection is determined by: obtaining a first set of points along the ray, where the reference point of the second set belongs to the first set of points; determining a first set of world coordinates corresponding to the first set of points, where the first world coordinates belongs to the first set of world coordinates; determining, based on the terrain map and corresponding to the first set of points, a second set of points on the road surface; determining a second set of world coordinates corresponding to the second set of points; determining plurality of heights between each point associated with the first set of world coordinates and a corresponding point associated with the second set of world coordinates; determining a minimum height from the plurality of heights; identifying a point from the second set of points associated with the minimum height; and obtaining world coordinates of the point, where the second world coordinates are determined to be same as the world coordinates of the point.

In some embodiments, the second world coordinates of the point of intersection is determined by: determining a first mathematical function that describes the ray; determining, based on the terrain map, world coordinates of two or more points on the bounding box; determining a second mathematical function that describes a plane that includes the two or more points; determining an intersection of the first mathematical function and the second mathematical function; and obtaining world coordinates of the intersection, where the second world coordinates are determined to be same as the world coordinates of the intersection.

At the assigning operation 918, the second world coordinates for the second set of one or more reference points are assigned to a location of the detected object in the spatial region.

In some embodiments, the detected object includes a car, a truck, a truck-trailer, a semi-truck, an emergency vehicle, a pedestrian, a motorcycle, or an obstacle on a road. In some embodiments, the vehicle is an autonomous semi-trailer truck. In some embodiments, the image is from a first region towards which the vehicle is being driven, or where the image is from a second region to a side of the vehicle, or where the image is from a third region away from which the vehicle is being driven.

In some embodiments, operations associated the cropping the portion, the detecting the object, the adding a bounding box, the determining the one or more positions, the determining the camera coordinates, the determining the second world coordinates, and the assigning the second world coordinates are performed in real-time while the vehicle is being driven. In some embodiments, the detected object in the cropped portion of the image is located at a distance between 500 meters and 1000 meters.

f. Second Example Image Processing Technique by Picture-in-Picture Module

The PIP module described in this patent document can use map related information, localization information, and navigation information during autonomous driving to provide an efficient image processing framework as further described in this section.

An autonomous driving system may include multiple pairs of cameras, where one pair or cameras may have a lens that is different from another pair of cameras. Each pair of cameras may have overlap in perception ranges for redundancy. In a general perception pipeline of an online autonomous driving system, the output images from cameras can be fed into modules described in FIG. 1 such as those used for cropping, object detection and/or segmentation. However, in some scenarios, only part of the images is relevant for autonomous driving operations, and for each image, only a part of the image can be relevant for autonomous driving operations. A relevant part of an image can be referred to as a region of interest (ROI), which can include lanes on roads, road markers, pedestrians, vehicles, and other objects that can influence autonomous driving operation or behavior. Thus, there may be regions in an image that may not be relevant for autonomous driving (e.g., sky, trees, etc.).

Therefore, in some scenarios, the image processing described for the various modules in this patent document may not need to be performed on all the images and/or on an entire image. Furthermore, if an ROI overlap between images obtained by different cameras, the ROI from one of the cameras can be disregarded since the ROI from the other camera can be processed. By doing this, computational efficiencies can be improved and latency of the autonomous driving pipeline can be improved. The following technical description can be used to detect and select ROIs in camera images for an online autonomous driving system.

Figure 10:
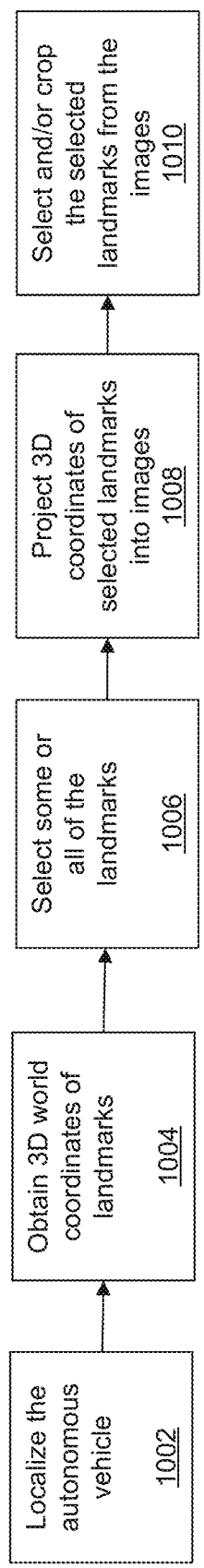
FIG. 10 shows an example of a flowchart to detect and select regions of interest (ROIs) in an image.

FIG. 10 shows an example of a flowchart to detect and select ROIs in an image. At operation 1002, The PIP module can use localization techniques and map information to localize the autonomous vehicle during autonomous driving. In some embodiments, the PIP module may obtain the real-time position information from a GPS device in the autonomous vehicle. Since each image obtained by the PIP module can be associated with a timestamp value that indicates when the image was obtained, the PIP module can also obtain a 3D world coordinates of the autonomous vehicle for each timestamp. Based on the 3D world coordinates of the autonomous vehicle, the PIP module can perform operation 1004 by querying a map database (e.g., the terrain map database) to obtain the 3D world coordinate positions of landmarks (e.g., rod lanes, road markers, road signs, traffic light, and etc.) that surround the autonomous vehicle (e.g., located in front of or behind of or next to the autonomous vehicle). In some embodiments, the PIP module can query the map database to obtain 3D world coordinates of landmarks within a pre-determined distance (e.g., 500 meters, 750 meters, 1000 meters, etc.) of the location of the autonomous vehicle.

After getting the 3D coordinates of surrounding landmarks, the PIP module can perform a filtering operation 1006 by selecting some or all of the landmarks that may impact or that may have a potential to impact the behavior of the autonomous vehicle. In some embodiments, a set of landmarks that impact or have a potential to impact autonomous vehicle behavior may be previously stored in the onboard computer located in the autonomous vehicle. For example, a front merge-in ramp could influence the autonomous vehicle when it is on the highway at least because cars may merge in front of the autonomous vehicle. In such an example, the autonomous vehicle may choose to change lane in order to avoid the potential for a collision with merging-in vehicles. In another example, a traffic light or stop sign could also have an impact on the autonomous vehicle when it is approaching a crossroad in a local area. Thus, based on a set of previously stored landmarks considered to have an impact on the autonomous vehicle, the PIP module can select landmarks in an image that may impact autonomous vehicle behavior.

After the PIP module selects the landmarks that surround the autonomous vehicle and that could impact the autonomous vehicle operation, the PIP module can perform a projecting operation 1008 by projecting the 3D coordinates of the selected landmarks into images using the techniques described in this patent document using, for example, a computer vision algorithm. Thus, the PIP module can obtain the position of the selected landmarks in images, which are considered relevant ROIs in images.

After the PIP module obtains the position of the selected landmarks, the PIP module performs a crop operation 1010 where the PIP module selects and/or crops the ROIs. The PIP module can select a limited number of crops in images to cover as many ROIs as possible. The PIP module can use, for example, a set cover technique and/or Greedy algorithm to select one or more regions to crop one or more ROIs.

The PIP module can perform the operations described in FIG. 10 in real-time as the cameras onboard the autonomous vehicles are providing images of areas surrounding the autonomous vehicle. In an example embodiment, the PIP module can assign an order in which the images from the cameras can be processed as further described below. In a first step, the PIP module can define an order of images obtained by cameras. For example, if each of 5 different cameras produce 5 images for one timestamp, the PIP module can define the image order as 1, 2, 3, 4, 5, where each number can represent the index of one camera image. In a second step, the PIP module can locate relevant ROIs in image 1 of each camera using the operations described in FIG. 10. In a third step, the PIP module can remove the ROIs which are selected or cropped by previous images that are obtained in time before the time when images 1-5 were obtained. The previous images may be obtained by the same camera that obtained image 1 or another camera. If there are no ROIs left in the current image, then the PIP module determines not to continue to process the current image and moves onto to the next image (e.g., image 2). If the PIP module determines that there are some ROIs left in current image, the PIP module can determine as few as possible crops to cover all remaining ROIs, where the crops are the selection result for this image. The PIP module can repeat the three steps mentioned above for each of the other images (e.g., images 2-5).

There are several technical advantages of using the techniques described in this Section I.e. The described techniques can be used to detect and select ROIs and it can reduce the online computing resource wasting at least because perception algorithms (such as image detection and segmentation) tend to rely heavily on graphic processor unit (GPU) or similar devices. The described techniques can also reduce the online computing runtime and latency of the perception pipeline. Finally, by feeding the cropped images into perception algorithms, instead of the whole image, the described techniques can increase the perception range (e.g., up to 1000 meters or even farther).

Figure 11:
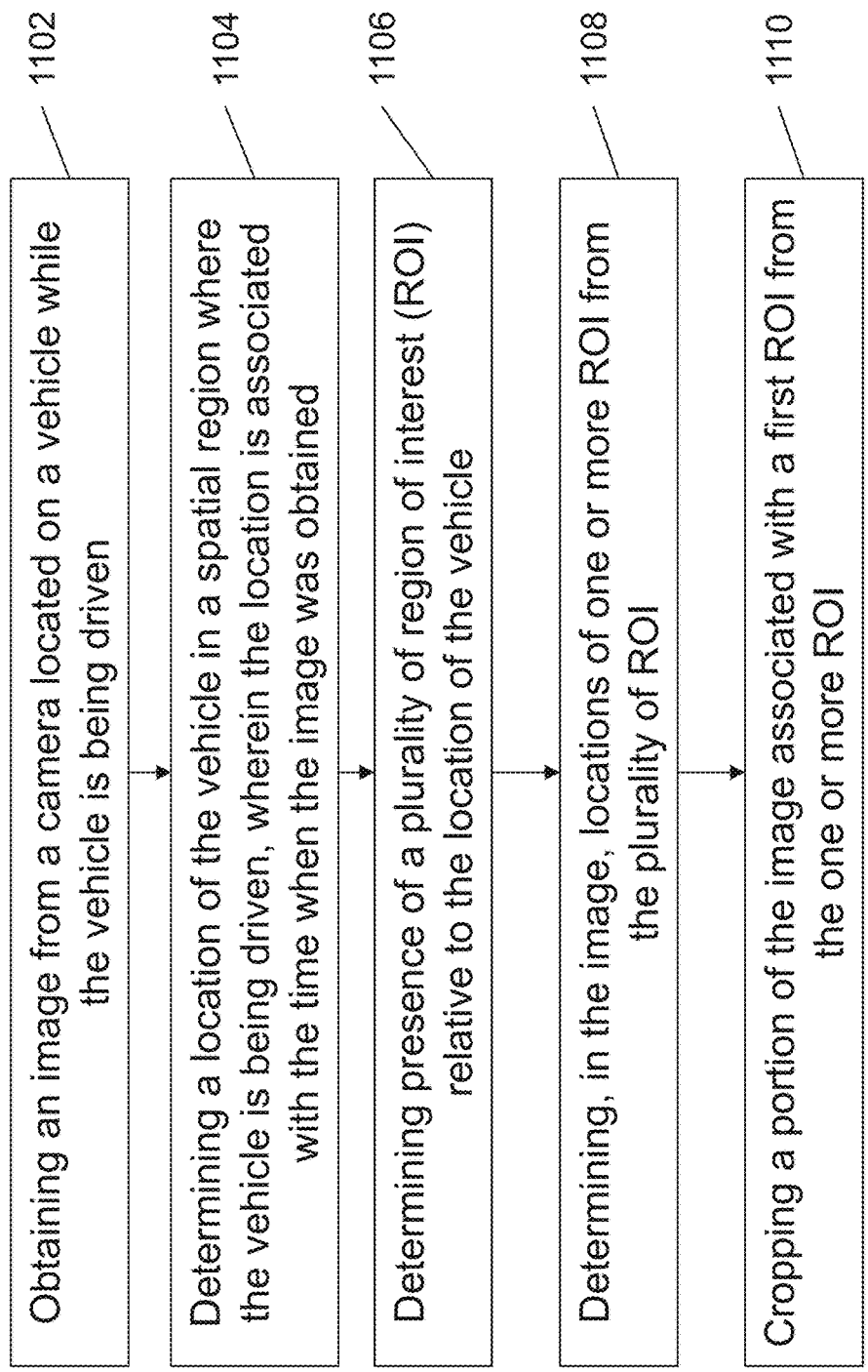
FIG. 11 shows an exemplary technique to crop a portion of an image by determining regions of interest located around an autonomous vehicle and by filtering at least some of the determined regions of interest.

FIG. 11 shows an exemplary technique to crop a portion of an image by determining regions of interest located around an autonomous vehicle and by filtering at least some of the determined regions of interest. At operation 1102, a PIP module obtains an image from a camera located on a vehicle while the vehicle is being driven, where the image is associated with a time that describes when the image was obtained. At operation 1104, the PIP module determines a location of the vehicle in a spatial region where the vehicle is being driven, where the location is associated with the time when the image was obtained.

At operation 1106, the PIP module determines presence of a plurality of region of interest (ROI) relative to the location of the vehicle. In some embodiments, the presence of the plurality of ROI is determined by querying a database and obtaining three-dimensional world coordinates of the plurality of ROIs that are located within a pre-determined distance from the location of the vehicle. In some embodiments, the location of the plurality of ROI in the image is determined by projecting the three-dimensional world coordinates of the plurality of ROI to the image. In some embodiments, the pre-determined distance includes 500 meters, 750 meters, or 1000 meters. In some embodiments, the plurality of ROI include a highway on-ramp, a traffic light, a stop sign, road lanes, road sign, or road markers, and the one or more ROI include the highway on-ramp, the traffic light, or the stop sign.

In some embodiments, the presence of the plurality of ROI is determined by querying a database and obtaining three-dimensional world coordinates of the plurality of ROIs that are located within a pre-determined distance from the location of the vehicle.

At operation 1108, the PIP module determines, in the image, locations of one or more ROI from the plurality of ROI. In some embodiments, the one or more ROI are selected from the plurality of ROI in response to determining that the one or more ROI affect or have a potential to affect an operation of the vehicle. In some embodiments, prior to the determining the locations of the one or more ROI, the method comprises selecting the one or more ROI from the plurality of ROI in response to determining that the one or more ROI affect or have a potential to affect an operation of the vehicle. In some embodiments, the one or more ROI affect or have a potential to affect an operation of the vehicle. At operation 1110, the PIP module crops a portion of the image associated with a first ROI from the one or more ROI.

In some embodiments, after determining the locations of the one or more ROI in the image, the method further comprises: determining that the image includes, from the one or more ROI, a second ROI that is same as that selected or cropped in a second image that is obtained at a second time prior to the time when the image is obtained, and determining that the second ROI is excluded from the one or more ROI prior to the cropping the portion of the image associated with the first ROI. In some embodiments, the second image is obtained by another camera located on the vehicle. In some embodiments, the second image is obtained by the camera located on the vehicle.

In some embodiments, the method further comprises selecting one or more reference points located at one or more pre-determined distances relative to the location of the vehicle, determining one or more positions of the one or more reference points on the image, and cropping another portion of the image corresponding to another ROI that is identified based on the one or more positions of the one or more reference points on the image. In some embodiments, the selecting of the one or more reference points comprises obtaining three-dimensional world coordinates of the one or more reference points based on the terrain map and the location of the vehicle, the one or more positions of the one or more reference points on the image are determined by projecting the three-dimensional world coordinates of the one or more reference points to the image by using a camera pose information associated with the image, and the camera pose information characterizes optical properties, orientation, or location of the camera. In some embodiments, a position of a single reference point on the image is a center point of the another ROI. In some embodiments, the one or more pre-determined distances include 500 meters, 750 meters, or 1000 meters.

In some embodiments, the method further comprises determining that the image includes, from the one or more ROI, a second ROI that is same as that selected or cropped in a second image that is obtained at a second time prior to the time when the image is obtained, and determining that the second ROI is excluded from the one or more ROI prior to the cropping the portion of the image associated with the first ROI. In some embodiments, the image is from a first region towards which the vehicle is being driven, or the image is from a second region to a side of the vehicle, or the image is from a third region away from which the vehicle is being driven.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. An image processing method, comprising:
receiving bounding box information that describes a bounding box located around a detected object in an image, wherein the bounding box information is received while a vehicle is being driven;
determining, from the bounding box information and in the image, one or more positions of one or more reference points on the bounding box;
for each determined position of each reference point:
determining camera coordinates of a camera center point that is located on a camera coordinate plane located at a focal length distance away from an image plane where the image is received;
determining, based at least on the camera coordinates and the focal length distance, first world coordinates of a position of a reference point; and
determining, based on a terrain map and using a ray that passes through the camera coordinates of the camera center point and the first world coordinates of the position of the reference point in the image plane, second world coordinates of a point of intersection where the ray comprising the reference point intersects a road surface, wherein the terrain map provides coordinates of points in a spatial region where the vehicle is being driven; and
assigning the second world coordinates for the one or more reference points to a location of the detected object in the spatial region.

2. The method of claim 1, wherein the second world coordinates of the point of intersection are determined by:
obtaining a first set of points along the ray, wherein the reference point belongs to the first set of points;
determining a first set of world coordinates corresponding to the first set of points, wherein the first world coordinates belong to the first set of world coordinates;
determining, based on the terrain map and corresponding to the first set of points, a second set of points on the road surface;
determining a second set of world coordinates corresponding to the second set of points;
determining plurality of heights between each point associated with the first set of world coordinates and a corresponding point associated with the second set of world coordinates;
determining a minimum height from the plurality of heights;
identifying a point from the second set of points associated with the minimum height; and obtaining world coordinates of the point, wherein the second world coordinates are determined to be same as the world coordinates of the point.

3. The method of claim 1, wherein the second world coordinates of the point of intersection are determined by:
determining a first mathematical function that describes the ray;
determining, based on the terrain map, world coordinates of two or more points on the bounding box;
determining a second mathematical function that describes a plane that includes the two or more points;
determining an intersection of the first mathematical function and the second mathematical function; and
obtaining world coordinates of the intersection, wherein the second world coordinates are determined to be same as the world coordinates of the intersection.

4. The method of claim 1, wherein the bounding box includes a plurality of vertices located at a plurality of corners of the bounding box, wherein the one or more reference points includes a reference point located midpoint in between two vertices of the bounding box, and wherein the two vertices are closest to a surface of a road compared to other vertices of the bounding box.

5. The method of claim 1, wherein the detected object includes a car, a truck, a truck-trailer, a semi-truck, an emergency vehicle, a pedestrian, a motorcycle, or an obstacle on a road.

6. The method of claim 1, wherein the detected object in the image is located at a distance between 500 meters and 1000 meters.

7. A non-transitory computer readable storage medium having code stored thereon, the code, when executed by a processor, causing the processor to implement a method comprising:

receiving bounding box information that describes a bounding box located around a detected object in an image, wherein the bounding box information is received while a vehicle is being driven;

determining, from the bounding box information and in the image, one or more positions of one or more reference points on the bounding box;

for each determined position of each reference point:
determining camera coordinates of a camera center point that is located on a camera coordinate plane located at a focal length distance away from an image plane where the image is received;
determining, based at least on the camera coordinates and the focal length distance, first world coordinates of the position of the reference point; and
determining, based on a terrain map and using a ray that passes through the camera coordinates of the camera center point and the first world coordinates of the position of the reference point in the image plane, second world coordinates of a point of intersection where the ray comprising the reference point intersects a road surface, wherein the terrain map provides coordinates of points in a spatial region where the vehicle is being driven; and assigning the second world coordinates for the one or more reference points to a location of the detected object in the spatial region.

8. The non-transitory computer readable storage medium of claim 7, wherein a camera intrinsic matrix is used to determine the camera coordinates of the camera center point in the camera coordinate plane.

9. The non-transitory computer readable storage medium of claim 7, wherein a camera extrinsic matrix is used with the camera coordinates to determine the first world coordinates of the reference point.

10. The non-transitory computer readable storage medium of claim 7, wherein the image is cropped from a second image received from a camera located on the vehicle.

11. The non-transitory computer readable storage medium of claim 10, wherein the image is cropped while the vehicle is being driven.

12. The non-transitory computer readable storage medium of claim 7, wherein the image is from a first region towards which the vehicle is being driven.

13. The non-transitory computer readable storage medium of claim 7, wherein the image is from a second region to a side of the vehicle.

14. The non-transitory computer readable storage medium of claim 7, wherein the image is from a third region away from which the vehicle is being driven.

15. An image processing apparatus for an autonomous vehicle comprising at least one processor; and at least one memory including computer program code which, when executed by the at least one processor, cause the image processing apparatus to at least:

receive bounding box information that describes a bounding box located around a detected object in an image, wherein the bounding box information is received while a vehicle is being driven;

determine, from the bounding box information and in the image, one or more positions of one or more reference points on the bounding box;

for each determined position of each reference point:
determine camera coordinates of a camera center point that is located on a camera coordinate plane located at a focal length distance away from an image plane where the image is received;
determine, based at least on the camera coordinates and the focal length distance, first world coordinates of the position of the reference point; and
determine, based on a terrain map and using a ray that passes through the camera coordinates of the camera center point and the first world coordinates of the position of the reference point in the image plane, second world coordinates of a point of intersection where the ray comprising the reference point intersects a road surface, wherein the terrain map provides coordinates of points in a spatial region where the vehicle is being driven; and assign the second world coordinates for the one or more reference points to a location of the detected object in the spatial region.

16. The image processing apparatus of claim 15, wherein to determine the second world coordinates of the point of intersection, the at least one memory further includes computer program instructions which, when executed by the at least one processor, further cause the image processing apparatus to at least:

determine an intersection of the ray and two or more points on the bounding box; and obtain world coordinates of the intersection, wherein the second world coordinates are determined to be same as the world coordinates of the intersection.

17. The image processing apparatus of claim 15, wherein the bounding box includes a plurality of vertices located at a plurality of corners of the bounding box.

18. The image processing apparatus of claim 15, wherein the detected object includes another vehicle.

19. The image processing apparatus of claim 15, wherein the vehicle is an autonomous semi-trailer truck.

20. The image processing apparatus of claim 15, wherein the image processing apparatus is further configured to determine the one or more positions, determine the camera coordinates, determine the second world coordinates, and assign the second world coordinates in real-time while the vehicle is being driven.

* * * * *